(12) United States Patent
Chen

(10) Patent No.: US 9,771,115 B2
(45) Date of Patent: Sep. 26, 2017

(54) SCOOTER WITH REAR SWIVEL WHEEL

(71) Applicant: RAZOR USA LLC, Cerritos, CA (US)

(72) Inventor: Robert Chen, San Marino, CA (US)

(73) Assignee: RAZOR USA LLC, Cerritos, CA (US)

( * ) Notice: Subject to any disclaimer, the term of this patent is extended or adjusted under 35 U.S.C. 154(b) by 2 days.

(21) Appl. No.: 15/205,392

(22) Filed: Jul. 8, 2016

(65) Prior Publication Data

US 2017/0008589 A1 Jan. 12, 2017

Related U.S. Application Data

(63) Continuation of application No. 14/522,295, filed on Oct. 23, 2014, now Pat. No. 9,387,900, which is a continuation of application No. 13/826,484, filed on Mar. 14, 2013, now Pat. No. 8,870,200.

(60) Provisional application No. 61/616,121, filed on Mar. 27, 2012.

(51) Int. Cl.
| | |
|---|---|
| B62K 21/00 | (2006.01) |
| B62K 3/00 | (2006.01) |
| B62B 3/00 | (2006.01) |
| B62K 21/12 | (2006.01) |
| B62L 1/04 | (2006.01) |
| B62L 3/04 | (2006.01) |

(52) U.S. Cl.
CPC .............. *B62K 3/002* (2013.01); *B62B 3/001* (2013.01); *B62K 21/12* (2013.01); *B62L 1/04* (2013.01); *B62L 3/04* (2013.01)

(58) Field of Classification Search
CPC ..... B62K 3/002; B62K 21/00; B62K 2700/56
See application file for complete search history.

(56) References Cited

U.S. PATENT DOCUMENTS

| | | |
|---|---|---|
| 1,297,282 A | 3/1919 | White |
| 1,391,312 A | 9/1921 | Gebhardt |
| 1,570,189 A | 1/1926 | Sturm |
| 1,658,068 A | 2/1928 | White |
| 1,687,953 A | 10/1928 | Starks |
| 1,968,975 A | 8/1934 | Upsacker et al. |
| 2,546,711 A | 3/1951 | Amendt |
| 3,396,928 A | 8/1968 | Lay |
| 3,620,547 A | 11/1971 | Vaverek |
| 4,144,822 A | 3/1979 | Roberts et al. |
| 4,394,029 A | 7/1983 | Holmgren |
| 4,584,735 A | 4/1986 | Garber |
| 4,707,884 A | 11/1987 | Chang |
| 4,735,392 A | 4/1988 | Farmer |
| 4,905,946 A | 3/1990 | Wang |
| 5,102,079 A | 4/1992 | Lee |

(Continued)

*Primary Examiner* — Bryan Evans
(74) *Attorney, Agent, or Firm* — Knobbe, Martens, Olson & Bear, LLP

(57) ABSTRACT

A personal mobility vehicle or scooter includes a least one swivel caster wheel supported at the rear of the scooter. The scooter has a body that includes a deck and a handlebar assembly. The scooter includes at least one front wheel with the deck extending between the at least one front wheel and the at least one swivel wheel. The scooter can also include an angled rear portion supporting a rear swivel caster wheel such that the pivot axis of the swivel wheel is inclined with respect to the top surface of the deck. Embodiments of the scooter also include a swivel braking assembly configured to apply a braking force to the at least one swivel wheel.

23 Claims, 10 Drawing Sheets

(56) References Cited

U.S. PATENT DOCUMENTS

| | | |
|---|---|---|
| 5,183,129 A | 2/1993 | Powell |
| 5,238,082 A | 8/1993 | Stegeman et al. |
| 5,437,425 A | 8/1995 | Hou |
| 5,630,633 A | 5/1997 | Dupre et al. |
| 5,692,761 A | 12/1997 | Havlovitz |
| 5,816,614 A | 10/1998 | Kramer, Jr. et al. |
| 5,848,660 A | 12/1998 | McGreen |
| 5,927,733 A | 7/1999 | Banda |
| 5,938,223 A | 8/1999 | Kotlier |
| 5,954,349 A | 9/1999 | Rutzel |
| 5,992,566 A | 11/1999 | Yeh |
| 6,120,044 A | 9/2000 | Tsai |
| 6,182,988 B1 | 2/2001 | Wu |
| D438,912 S | 3/2001 | Barrera |
| D439,623 S | 3/2001 | Barrera |
| 6,206,387 B1 | 3/2001 | Tsai |
| D444,824 S | 7/2001 | Udwin et al. |
| D446,259 S | 8/2001 | Udwin et al. |
| D447,187 S | 8/2001 | Powers |
| 6,431,567 B2 | 8/2002 | Tsai |
| 6,619,678 B2 | 9/2003 | van Ardenne |
| 6,619,679 B2 | 9/2003 | Lan |
| D486,532 S | 2/2004 | Christianson |
| D492,367 S | 6/2004 | Dennis |
| 7,195,259 B2 | 3/2007 | Kang |
| 7,549,655 B2 * | 6/2009 | Fan ............... B62K 3/002 280/87.041 |
| 7,597,334 B2 * | 10/2009 | Chen ............. B62K 3/002 280/62 |
| 7,600,768 B2 | 10/2009 | Chen et al. |
| 7,766,351 B2 | 8/2010 | Chen et al. |
| 7,823,675 B2 | 11/2010 | Kermani |
| 9,387,900 B2 | 7/2016 | Chen |
| 2007/0182123 A1 * | 8/2007 | Bryant ........... B62K 21/08 280/271 |
| 2011/0127740 A1 * | 6/2011 | Yamabe ......... B62K 3/002 280/87.041 |

* cited by examiner

SCOOTER WITH REAR SWIVEL WHEEL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

The present application is a continuation of U.S. patent application Ser. No. 14/522,295, filed Oct. 23, 2014, entitled "SCOOTER WITH REAR SWIVEL WHEEL,", which is a continuation of U.S. patent application Ser. No. 13/826,484, filed Mar. 14, 2013, entitled "SCOOTER WITH REAR SWIVEL WHEEL," now U.S. Pat. No. 8,870,200, which claims benefit under 35 U.S.C. §119(e) to U.S. Provisional Patent Application No. 61/616,121, filed Mar. 27, 2012, entitled "SCOOTER WITH REAR SWIVEL CASTER WHEEL." The entireties of each of the aforementioned applications are hereby expressly incorporated by reference.

BACKGROUND OF THE DISCLOSURE

Field of the Invention

Embodiments of the invention relate generally to personal mobility vehicles and, more specifically, to a scooter having at least one swivel caster wheel located at the rear portion of the scooter.

Description of the Related Art

The use of personal mobility vehicles, such as scooters, has become a popular recreational activity as well as useful means of personal transportation. Scooters have become popular among many age groups and there are many different scooter variations and scooter designs. Scooter designs have become more compact and convenient, and many scooters have folding mechanisms allowing the user to easily store or carry the scooter. Conventional scooters have at least two wheels and a steering mechanism.

Scooters provide useful means of personal transportation and recreation, but due to the limited range of motion of the front and rear wheels, the conventional scooters are limited in the type of movement provided to the user. Due to the fixed nature of the wheels, conventional scooters do not allow any side-to-side movement by the user, or any turning motion of the scooter other than by steering the front wheel in which the path of the rear wheel substantially tracks the path of the front wheel.

SUMMARY OF THE DISCLOSURE

An aspect of the present invention is the realization that allowing the user to perform a side to side movement or allowing the user to direct the riding board in a sideways arcuate path, is practicable with a two-wheeled scooter (e.g., a kick-scooter) and would increase the user's enjoyment and providing additional ability for advanced users to perform various stunts or tricks.

Conventional scooter braking mechanisms can be ineffective and would not function effectively with a pivoting or swiveling wheel. Also, using a conventional scooter, a user is only able to propel the scooter forward by pushing off the ground with one of the user's feet. A user is also limited to steering the front wheel of the conventional scooter, and continues moving forward in a generally limited direction and orientation. What is needed is an improved and new scooter and brake design that provides alternative range of movement to the user.

Preferred embodiments of the personal mobility vehicle are configured to allow a user to propel a caster-wheeled scooter by pushing off of the ground with one of the user's feet. A user is able to cause the scooter to travel in a generally linear forward direction by steering the front wheel with a handlebar assembly configured to change the direction of the front wheel. Preferred embodiments of the scooter also generally include at least one swivel caster wheel located on the rear of the scooter, allowing the user to cause the scooter to travel in a non-linear movement or ride the scooter using a side to side motion similar to the rear movement of a swivel caster board.

A preferred embodiment of a scooter includes a body comprising a deck and the deck has a substantially planar top surface configured to support a user. The scooter includes at least one front wheel supported by the body and an angled rear portion supported by the body. It also includes a rear swivel wheel assembly comprising: an attachment portion coupled to the angled rear portion, a rear wheel rotatable about a wheel axis, and a support portion coupled to the attachment portion and configured to support the rear wheel. The support portion is configured to allow pivoting of the rear wheel relative to the angled rear portion and about a swivel axis. The angled rear portion is inclined with respect to the top surface of the deck and extends upward at an angle relative to the top surface of the deck, and the swivel axis is inclined with respect to the top surface of the deck.

Another embodiment of a personal mobility vehicle comprises a body having a deck configured to support a user and the body also comprising an inclined portion. The vehicle also includes a rear swivel wheel assembly supported by the inclined portion and the rear swivel wheel assembly includes a rear wheel configured to pivot about a swivel axis. The vehicle includes a brake assembly comprising: an attachment portion configured to be supported by the body, an actuator portion that is accessible to the foot of the user, and a braking surface supported by the brake assembly and configured to apply frictional braking force to the rear wheel when in contact with the rear wheel at various degrees of rotation of the rear wheel about the swivel axis. The brake assembly has an engaged position in which the braking surface is in contact with the rear wheel and the brake assembly is movable to the engaged position in response to the user acting upon the actuator portion.

Another preferred embodiment is a scooter having at least one swivel caster wheel mounted on the rear of the scooter, and at least one swivel caster wheel mounted on the front of the scooter, with the front swivel caster wheel operably coupled to a steering mechanism available to the user. In this embodiment, the user is able to cause the scooter to travel in a generally linear forward direction by pushing off of the ground with one of the user's feet and directing the front wheel with the steering mechanism. The user is also able to propel the scooter forward using a side to side motion which causes the scooter to propel forward due to the front and rear swivel caster wheels being mounted at an angle relative to the user support platform.

In this embodiment, the front swivel caster wheel may have a centering mechanism biasing the caster wheel to a neutral steering position. A spring action device may be mounted between the caster wheel assembly and some fixed portion of the user support platform of the scooter to provide rotational resistance to the caster wheel. In another preferred embodiment, self-centering of the swivel caster assembly may be provided by a torsion spring arrangement, such as a helical torsion spring. In these embodiments, the self-centering spring provides resistance to pivoting or turning of the swivel caster wheel assembly fork about its turning axis allowing the caster wheel to be steered by the user. The self-centering spring mechanism may also provide rotational resistance and a biasing force on the swivel caster wheel to return the swivel caster wheel to its neutral steering position when the scooter is being propelled by side to side movement by the user to propel the scooter in a forward direction.

Another preferred embodiment is a scooter having at least one swivel caster wheel mounted on the rear of the scooter, a front wheel operably coupled to a steering mechanism available to the user, where the scooter includes a rear braking mechanism which creates a frictional braking force upon the rear swivel caster wheel when acted upon by the user.

BRIEF DESCRIPTION OF THE DRAWINGS

These and other features, aspects, and advantages of the present invention are described below with reference to illustrations of a preferred embodiment, which is intended to illustrate, but not to limit, the present invention.

DETAILED DESCRIPTION OF THE PREFERRED EMBODIMENTS

Reference will now be made in detail to the embodiments of the present technology. While numerous specific embodiments of the present technology will be described in conjunction with the alternative embodiments, it will be understood that they are not intended to limit the present technology to these embodiments. Instead, these described embodiments of the present technology are intended to cover alternatives, modifications and equivalents. Furthermore, in the following detailed numerous specific details are set forth in order to provide a thorough understanding of the present technology. However, it will be recognized by one of ordinary skill in the art that embodiments may be practiced without these specific details. In other instances, well known methods, procedures, components, compositions and mechanisms have not been described in detail as not to unnecessarily obscure aspects of embodiments of the present technology.

Figure 1:
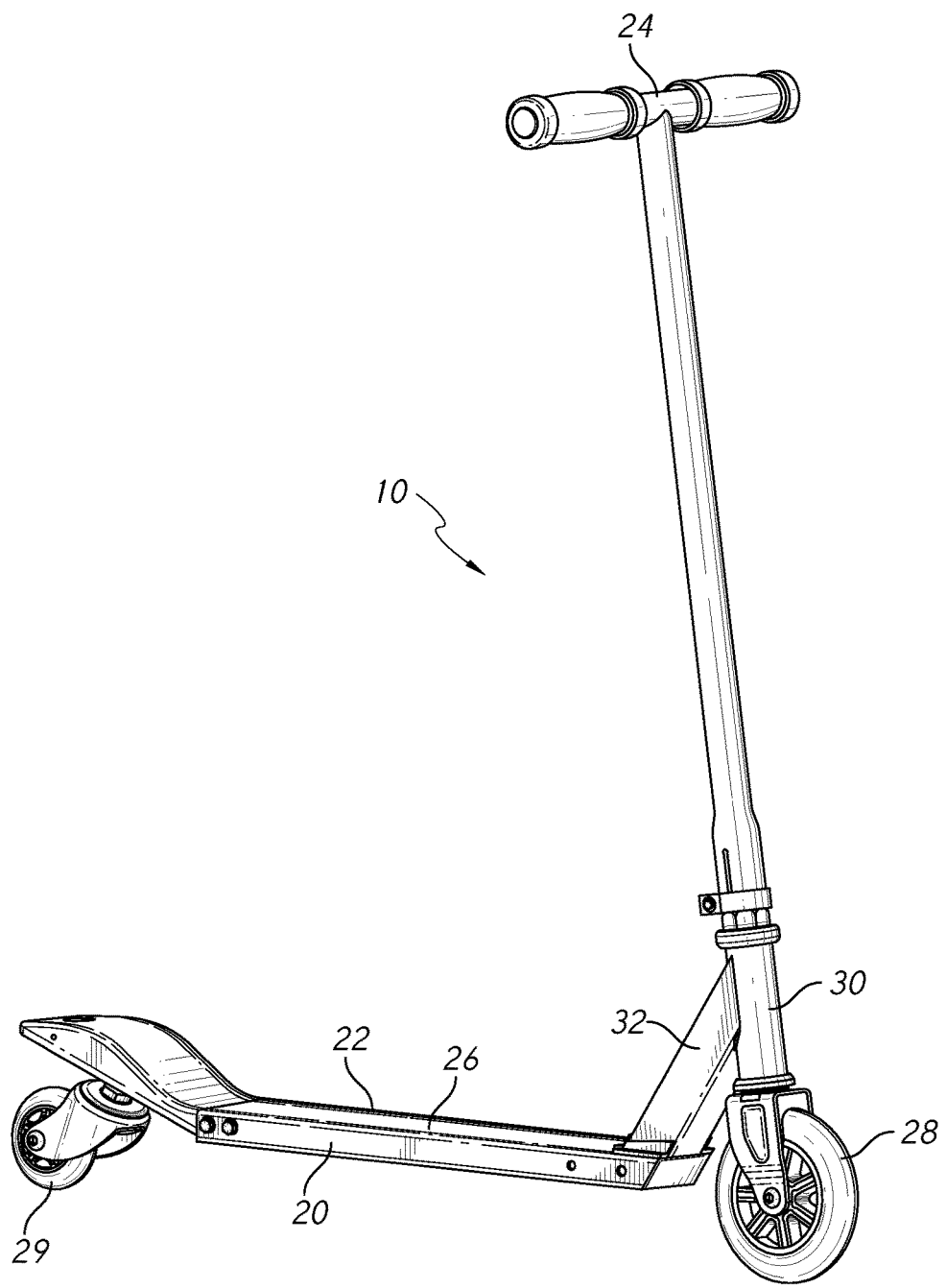
FIG. 1 is a perspective view of a scooter.

FIG. 1 shows a scooter 10 having certain features, aspects and advantages of the present disclosure. The depicted embodiment includes a scooter body 20, which includes a deck 22 and a handlebar assembly 24. Preferably, the upper surface of the deck 22 includes a foot rest surface 26 which is configured to support a foot or the feet of a user. The scooter 10 includes at least one front wheel 28 and at least one rear swivel caster wheel 29 supported by the scooter body 20. The illustrated scooter 10 includes a front wheel 28 and a rear wheel 29 spaced apart from one another with the deck 22 extending therebetween. Preferably, the wheels 28, 29 are aligned in the same plane when the wheels 28, 29 are in a neutral position, as illustrated, and located at opposite ends of the deck 22. As illustrated, a preferred embodiment of the scooter 10 also includes a head tube 30 which rotatably supports the handlebar assembly 24 so that the handlebar assembly 24 can rotate within the head tube 30. The front wheel 28 is operatively coupled to the handlebar assembly 24 so that a user can steer the front wheel 28 by moving the handlebar assembly 24. Preferably, the height of the handlebar assembly 24 can be adjusted by sliding telescoping portions of the handlebar assembly 24 relative to one another in a direction toward or away from the deck 22. The scooter body 20 includes a support assembly 32 between the head tube 30 and the deck 22. A pivoting mechanism (not shown) may be configured to allow the support assembly 32 and head tube 30 to rotate with respect to the scooter body 20. In one embodiment, the scooter 10 is a folding scooter with the pivoting mechanism located at the support assembly 32, head tube 30 or the handlebar assembly 24.

Figure 2:
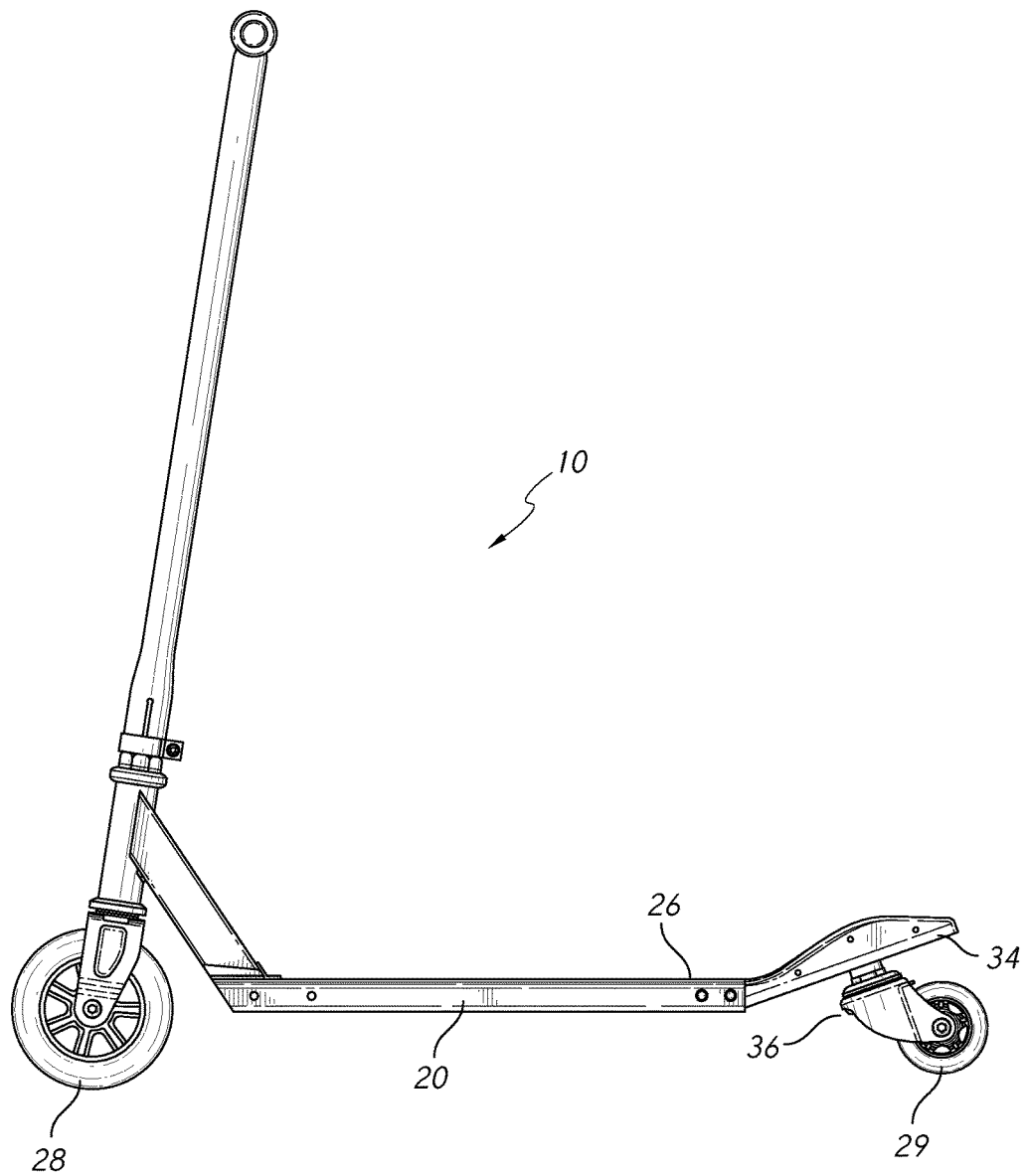
FIG. 2 is a side view of the scooter of FIG. 1.

FIG. 2 shows the scooter body 20 and wheels 28, 29 depicted in FIG. 1. The scooter body 20 includes an angled rear portion 34 supporting the rear swivel caster wheel 29. As illustrated, the angled rear portion 34 may be an integrated portion of deck 22 configured so that an angle is formed between the plane of the deck 22 and the plane of the angled rear portion 34. Preferably, the angle is an acute angle. In an alternate embodiment, the angled rear portion 34 may be a separate component coupled to the body 20 or deck 22 of the scooter so that an angle is formed with the plane of the deck 22. The angled rear portion 34 includes a bottom surface which supports a swivel caster wheel assembly 36. The wheel assembly 36 includes the rear swivel caster wheel 29. The rear swivel wheel 29 has a pivot or swivel axis about which it can pivot or swivel. In this embodiment, mounting the rear swivel caster wheel 29 and swivel caster wheel assembly 36 to the bottom surface of the angled rear portion 34 causes an inclination of the pivot axis of the swivel caster wheel assembly 36 with respect to the top surface of the deck 22. The pivot axis can be aligned so that it passes through the axis of the rear wheel axle, or the pivot axis can be forward of the axis of the rear wheel. In other embodiments, the angle between the plane of the deck 22 and the plane of the angled rear portion 34 is approximately 45 degrees, while in other embodiments this angle is greater than about 45 degrees. Preferably, the angle between the deck plane and the rear portion plane is less than about 45 degrees and greater than 1 degree. In some embodiments, the angle is less than about 30 degrees and greater than about 10 degrees.

The plane of the angled rear portion 34 also forms an angle with the plane of the riding surface and/or the plane that passes through the axles of the wheels 28 and 29. For example, the angle between the plane of the angled rear portion 34 and the plane of the riding surface is preferably an acute angle that is less than about 45 degrees. In some embodiments, this angle is less than about 30 degrees and greater than about 10 degrees. In other embodiments, the angle between the plane of the rear portion 34 and the plane passing through the axles of the wheels 28 and 29 is an acute angle and less than about 45 degrees. In other embodiments, this angle is less than about 30 degrees and greater than about 10 degrees. In other embodiments, the surfaces of the angled rear portion 34 are curved. Preferably, the inclined pivot axis of the rear swivel wheel 29 is inclined with respect to and forms an angle with plane of the riding surface, the plane of the deck 26 and the plane that passes through the axes of the axles of the wheels 29 and 28. Preferably, this angle between the inclined pivot axis and these planes is greater than about 45 degrees and in some embodiments can be between about 60 degrees and about 80 degrees.

The inclined pivot axis of the rear swivel caster wheel 29 allows the user to cause pivoting of the rear swivel caster wheel 29 by applying a force with a sideways component or an eccentric force to substantially one side of the rear portion of the foot rest surface 26 substantially above the rear swivel caster wheel 29. Pivot rotation of the rear swivel caster wheel assembly 36 allows the rear portion of the scooter 10 to travel in a substantially different direction than the general direction of the travel of the front portion of the scooter 10, rather than the rear wheel 29 necessarily substantially tracking the path of the front wheel 28. This allows the user to cause the rear portion of the scooter 10 to travel in a substantially side-to-side or sideways motion while the front of the scooter 10 is travelling in a linear forward direction following the rotation of the front wheel 28. This also allows the user to perform various stunts or tricks, including simulating a vehicular motion referred to as "drifting", wherein while performing a turn, the rotational directions of the front wheel and rear swivel caster wheel are pointing in the opposite direction to the direction of the turn.

Figure 3:
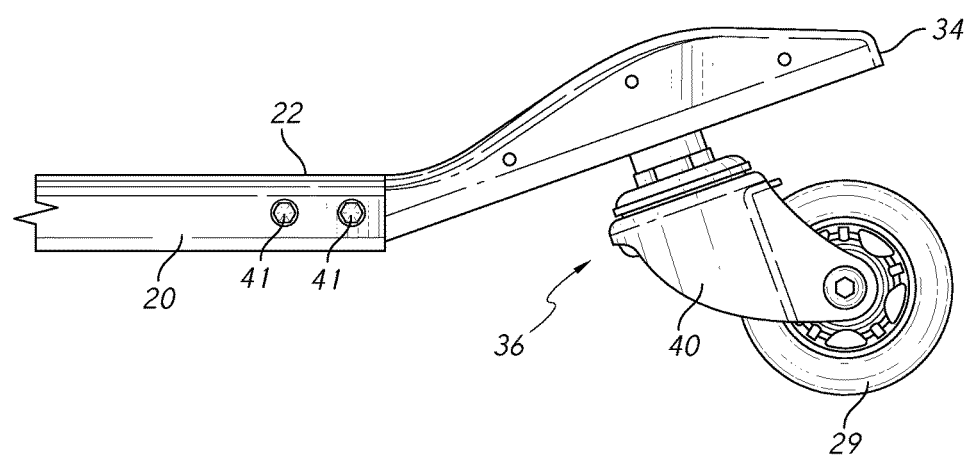
FIG. 3 is a side view of the rear portion of the scooter of FIG. 1.

FIG. 3 shows the angled rear portion 34 of the scooter body 20 and rear swivel caster wheel 29 depicted in FIG. 1 and FIG. 2. The swivel caster wheel assembly 36 is supported by or mounted to the bottom surface of the angled rear portion 34. The swivel caster wheel assembly 36 comprises a fork assembly 40. In the illustrated embodiment, the scooter body 20 includes an angled rear portion 34 and the angled rear portion extends above the deck 22 so that the top surface of the angled rear portion is inclined with respect to the top surface of the deck 22. This arrangement allows the scooter body and deck 22 and foot platform to be positioned at a low elevation relative to the riding surface and creates a low center of gravity for the user and scooter combination, providing greater stability and increasing turning ability for the user. As described above, the illustrated rear angled portion 34 can be a separate component that is coupled to the deck 22 by a suitable arrangement, such as fasteners 41. Preferably, the deck 22 is substantially planar and the rear angled portion 34 is angled upwardly relative to the deck 22. In one embodiment, an attachment portion (not visible) of the rear angled portion 34 is received within an internal space of the deck and can be angled with respect to the remainder of the rear angled portion 34.

In another embodiment, the deck 22 of the scooter 10 is configured to be substantially flat with no inclination at the rear of the deck. The rear angled portion 34 can extend in a direction substantially parallel to the deck 22 so that it is not inclined relative to the deck. In such an embodiment, the caster wheel assembly 36 can be configured to include an inclined portion or angled feature that causes the inclined pivot axis of the rear swivel wheels 29 to be inclined relative to the riding surface, the plane of the deck 22 and/or the plane passing through the axes of the wheel axles.

In another embodiment, the rear angled portion 34 extends below the plane of the deck 22 and said rear angled portion 34 creates a declined angle with respect to the bottom surface of the scooter body 20 or the deck 22. This embodiment positions the deck 22 and foot platform at a higher elevation relative to the ground and creates a higher center of gravity for the user and scooter combination. This embodiment also provides a substantially flat deck 22 and foot platform for the user and allows the user to place one or both of the user's feet directly above the rear caster wheel to apply sideways or eccentric forces to cause the caster assembly to pivot about the pivot axis. The elevated center of gravity in combination with the substantially flat deck 22 and foot platform allows the user to apply greater eccentric force upon the rear caster wheel to cause the caster wheel assembly to pivot about the pivot axis 44.

Figure 4:
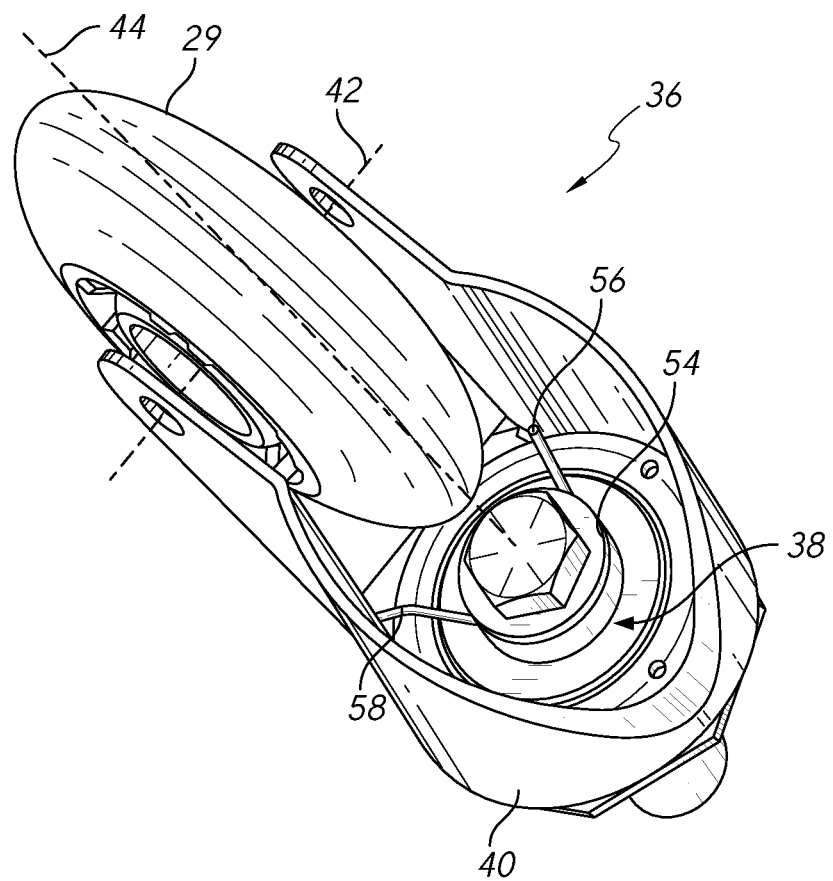
FIG. 4 is an isometric view of the swivel caster wheel assembly of the scooter of FIG. 1.
Figure 5:
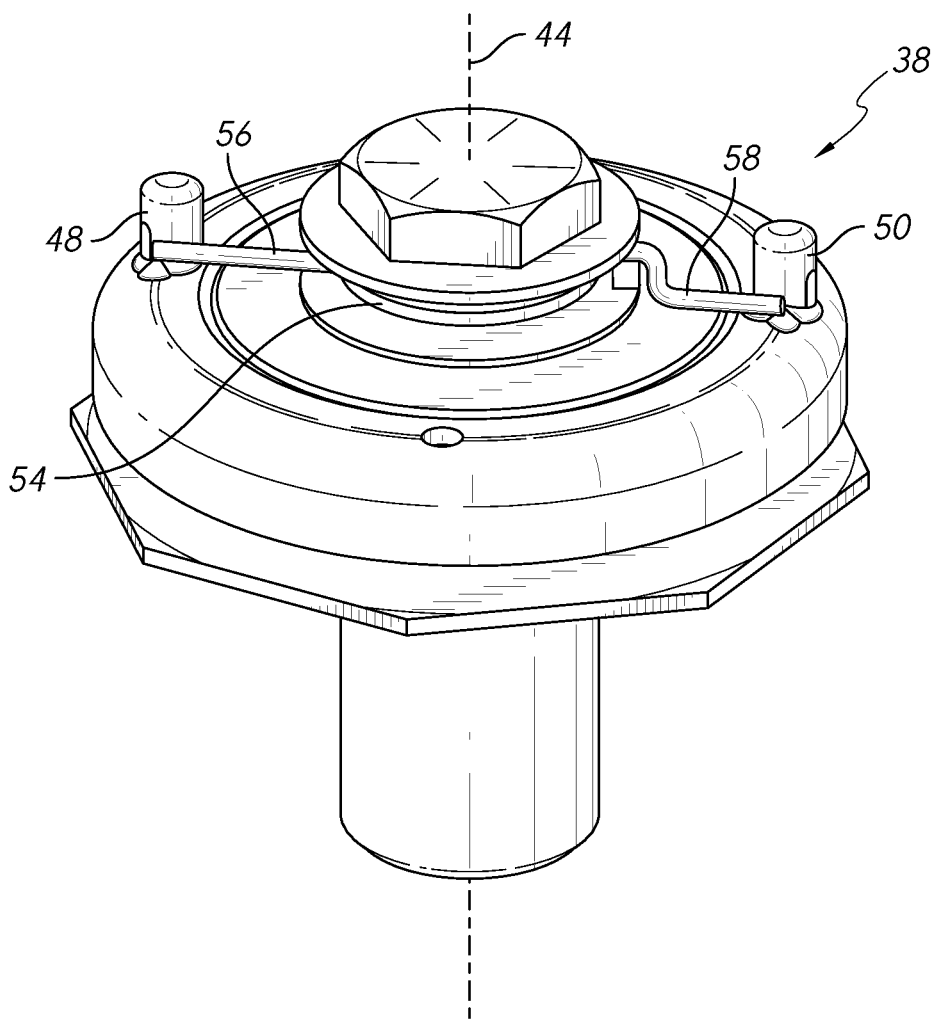
FIG. 5 is a perspective view of an alternate centering spring assembly.

Referring now to FIGS. 4 and 5, an embodiment of swivel caster wheel assembly 36 is shown, including centering spring assembly 38 coupled to the fork assembly 40. Rear swivel caster wheel 29 is coupled to the fork assembly 40 for rotation about the wheel rotation axis 42, such as on a conventional axle and bearing assembly. Conventional bearings and other hardware are not shown in this figure. Caster wheel assembly 36 may be secured or bolted to the scooter at an angled surface such as the angled rear portion 34 to permit pivoting of rear swivel caster wheel 29 about pivot axis 44, which when assembled to the scooter 10 preferably is oriented at an angle relative to a vertical direction. The centering spring assembly 38 may comprise a bearing assembly which can include an inner race and an outer race, where the outer race is mounted in a friction fit opening in a bearing ring of the fork shell assembly 40 for rotation about pivot axis 44, and the inner race is mounted to rotate relative to the outer race about the pivot axis 44.

The centering spring assembly 38 may further comprise a helical torsion spring 54 mounted to the outer race of the bearing assembly such that rotation of the outer race about the pivot axis 44 (along with the fork shell assembly 40) results in rotation of the helical torsion spring 54 about the pivot axis 44. The coil torsion spring 54 may include a first spring arm 56 and a second spring arm 58 extending outwardly from the center of coil torsion spring 54. One embodiment of the caster wheel assembly 36 includes a first spring post 48 and a second spring post 50 configured to abut first spring arm 56 and second spring arm 58, respectively, such that rotation of the fork shell assembly 40 about pivot axis 44 causes a twisting force to be applied to the helical torsion spring 54 when first spring arm 56 abuts first spring post 48 and restricts rotational movement of the first spring arm in one rotational direction, or second spring arm 58 abuts second spring post 50 and restricts rotational movement of the second spring arm in the other rotational direction. When all rotational force is removed from fork shell assembly 40, helical torsion spring 54 returns to its neutral position causing fork shell assembly 40 and thus swivel caster wheel assembly 36 to return to its neutral steering position.

Another embodiment of the centering spring assembly 38 may comprise one spring post, with the first spring arm 56 and second spring arm 58 extending from the center of helical torsion spring 54 in substantially a similar direction abutting the spring post on each side of said spring post. When a rotational force is applied to fork shell assembly 40 in one direction, first spring arm 56 abuts a first side of the spring post restricting rotational movement of the first spring arm and the rotational force creates a bending moment to helical torsion spring such that first spring arm 56 and second spring arm 58 are moved apart. This action is repeated for the second spring arm 58 and second side of the spring post when the rotational force is applied to the fork shell assembly in the other direction. When all rotational force is removed from fork shell assembly 40, helical torsion spring 54 returns to its neutral position causing fork shell assembly 40 and thus swivel caster wheel assembly 36 to return to its neutral steering position. It is understood that further embodiments are possible and considered incorporating similar elements to achieve the same result to cause the swivel caster wheel assembly to be centered when pivot rotational forces applied to the fork shell assembly can be overcome or are removed completely.

Figure 6:
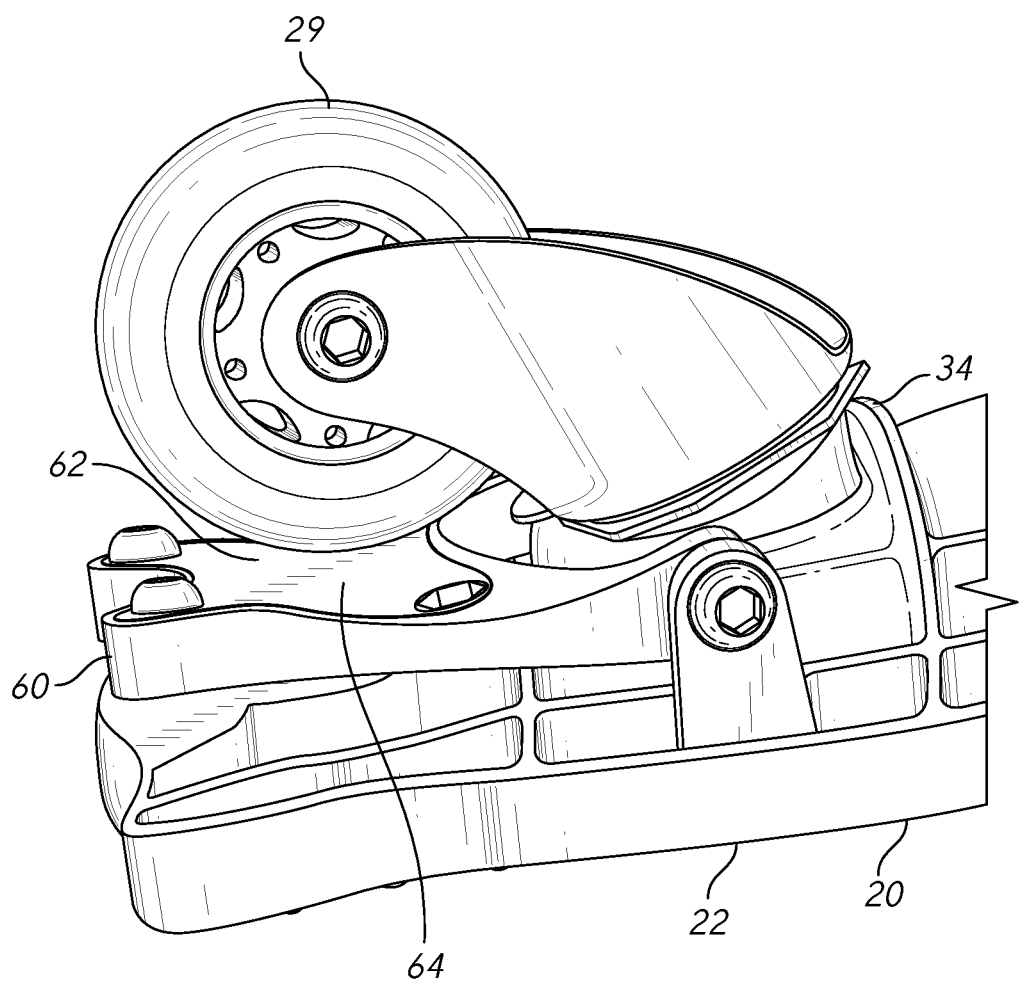
FIG. 6 is a side view of an alternate embodiment of a swivel caster wheel assembly and rear portion of a scooter with a brake.

Referring now to FIG. 6, a close up side view of a rear swivel caster wheel 29 with rear caster brake 60 is illustrated in an upside-down orientation. The rear caster brake 60 is rotatably or pivotably coupled to the rear of scooter body 20. In one embodiment the rear caster brake 60 is pivotably coupled to the angled rear portion 34 as depicted in FIG. 6. In another embodiment the rear caster brake 60 includes a braking surface 62 to apply frictional braking force upon the outer circumference of the rear swivel caster wheel 29. The rear portion of the deck 22 of the scooter body 20 may comprise a void extending from the top of deck 22 through the bottom surface of scooter body 20 and configured to have substantially the same shape and size as the rear caster brake 60 or a user actuator portion of the rear caster brake 60. In another embodiment, the rear caster brake 60 is pivotably coupled to the rear end of scooter body 20. In some embodiments, the rear caster brake 60 is positioned above the rear swivel caster wheel 29 such that the top surface of the rear caster brake 60 (or user actuator portion) is available to the foot of the user in a standing position above the deck.

In one embodiment, the rear caster brake 60 comprises a braking surface 62 which may be configured with a concave curvature 64 such that the degree of concave curvature is greater than or at least equal to the curvature of the outer circumference surface of the rear wheel to allow for maximum frictional contact between the braking surface 62 and the rear wheel. A biasing mechanism such as a spring or elastic member is included to bias the rear caster brake 60 toward a first position in which the braking surface is not in frictional contact with the outer circumference surface of the rear swivel caster wheel 29. The rear caster brake 60 is configured such that a downward force applied by the foot of a user causes the rear caster brake 60 to move from the first position to a second position in which the braking surface is in frictional contact with the outer circumference surface of the rear swivel caster wheel 29. The frictional contact applied by the bottom surface of the rear caster brake 60 causes the rear caster wheel 29 to slow in rotation, causing the scooter 10 to slow and/or come to a stop. Advantageously, the material of the frictional braking surface 62 can be selected to exhibit desirable frictional properties or wear properties, for example. Thus, the material of the frictional braking surface 62 can be optimized relative to the material used for the rear caster brake 60, if desired.

In the illustrated arrangement, the frictional braking surface 62 is directly affixed to the rear caster brake 60; however, in other arrangements, the frictional braking surface 62 could be indirectly or otherwise coupled (e.g., through a linkage arrangement) to the rear caster brake 60. For example, in such an arrangement, the frictional braking surface 62 could rotate about the pivot axis 44 along with the rear caster wheel 29 and could be actuated by a stationary actuator portion of the brake 60, which is configured to actuate the frictional braking surface 62 in multiple positions of the wheel 29, including all possible positions or a subset of all possible positions, such as in positions in which the wheel 29 is trailing or positioned behind the pivot axis 44. Alternatively, the frictional braking surface 62 and the actuator portion could rotate about the pivot axis 44 along with the rear caster wheel 29 and the actuator portion could be configured to remain accessible to the user in multiple positions of the wheel 29, including all possible positions or a subset of all possible positions, such as in positions in which the wheel 29 is trailing or positioned behind the pivot axis 44. In such an arrangement, if provided, the void can be larger than the actuator portion to permit rotational movement of the actuator portion throughout a desired range of motion of the rear wheel 29 about the pivot axis 44. Further, the void, acting on the actuator portion, could function as a limit stop arrangement to define maximum rotational positions of the rear wheel 29 about the pivot axis 44.

Figure 7:
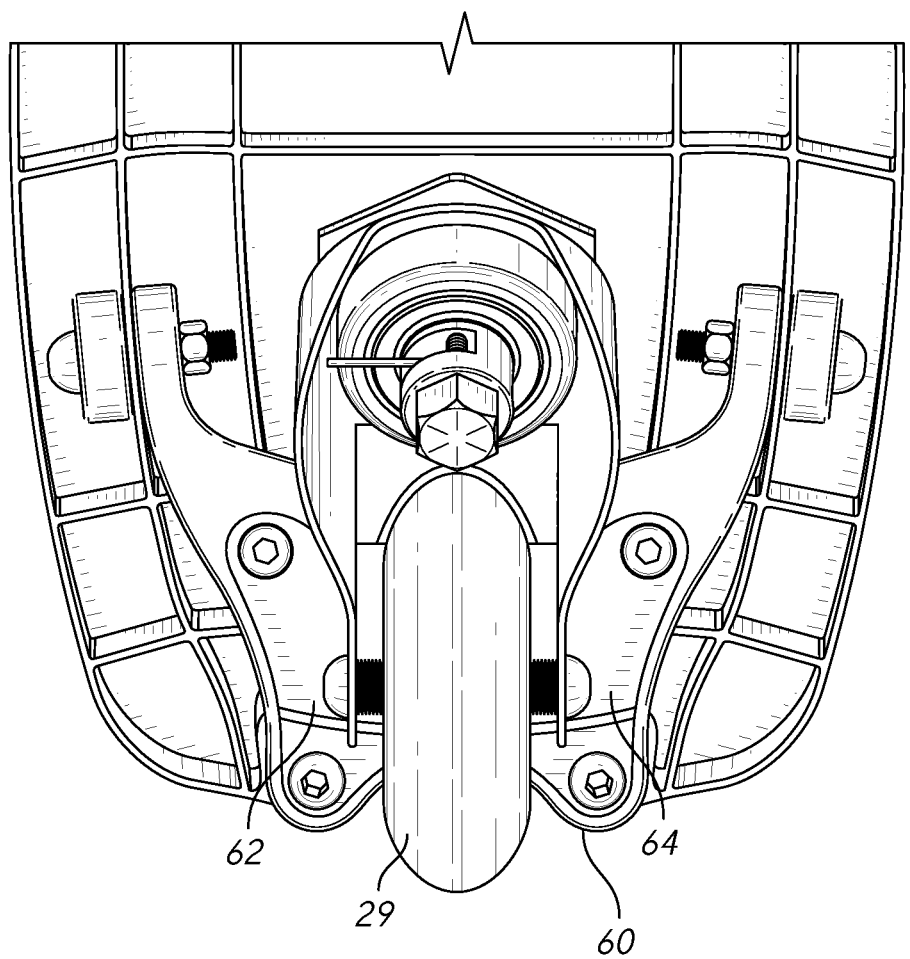
FIG. 7 is a top-down view of the underside of a swivel caster wheel assembly and brake mechanism of a scooter.

FIG. 7 shows a bottom view of a scooter and rear caster brake. In a preferred embodiment, the rear caster brake 60 may be configured such that the braking surface 62 is substantially greater in width than the width of rear caster wheel 29. This configuration allows the user to apply the rear caster brake while the rear caster assembly is pointed in a non-neutral steering direction. In a preferred embodiment, the rear caster brake 60 comprises a braking surface 62 with a concavely curved surface 64, where the concave curvature follows a laterally curved path such that the lateral curve of the concave curvature surface 64 substantially follows the general travel of the outer circumference of the rear caster wheel 29 as it pivots about the pivot axis 44. Thus, the laterally curved path of the concavely curved surface 64 defines a radius about the pivot axis 44 of the rear caster wheel 29. This configuration allows the user to apply the rear caster brake 60 while the rear caster wheel 29 is pointed in a generally non-neutral steering position to apply an effective and safe frictional braking force on the rear caster wheel 29. In another embodiment, the braking surface 62 consists of a durable material such as a hard plastic, metal, or metal alloy. In another embodiment, the braking surface 62 is removable and replaceable by the user.

Figure 8:
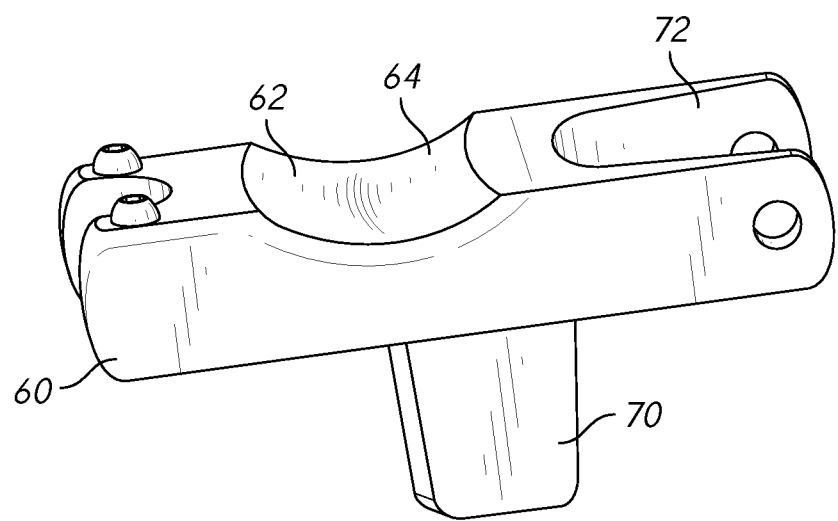
FIG. 8 is a perspective view of an embodiment of a swivel wheel brake assembly.

FIG. 8 illustrates an embodiment of a rear caster or swivel braking assembly including a brake 60. The braking assembly includes a braking surface 62 configured to contact a rear swivel wheel and apply a braking force to the wheel. The braking surface 62 includes a concave curvature 64 that can generally correspond to the outer circumferential surface of the rear swivel wheel 29, as described above. The curvature 64 allows for more contact area between the braking surface 62 and the wheel 29. The braking surface 62 can be coupled to or supported by the brake 60. The brake 60 can include a cut-out or recess portion configured to receive at least a portion of the braking surface 62. The brake 60 also includes an attachment portion 72 that is configured to be coupled to or supported by the body 20, deck 22, or the angled rear portion 34. Preferably, the attachment portion 72 is rotatably supported by the body 20, deck 22, and/or the angled rear portion 34. Preferably, the braking assembly is biased away from a position in which the braking surface 62 contacts the rear wheel 29.

The braking assembly can also include an actuation portion 70 that is coupled to the swivel brake 60. The actuation portion 70 can be configured to be accessible to the foot of a user such that a user can engage the brake 60. Preferably, the actuation portion extends upward from the brake 60 and toward a user riding the vehicle. The actuation portion 70 can extend through a void or opening in the body 20, deck 22, and/or the angled rear portion 34 so as to be accessible to the foot of a user.

Figure 9:
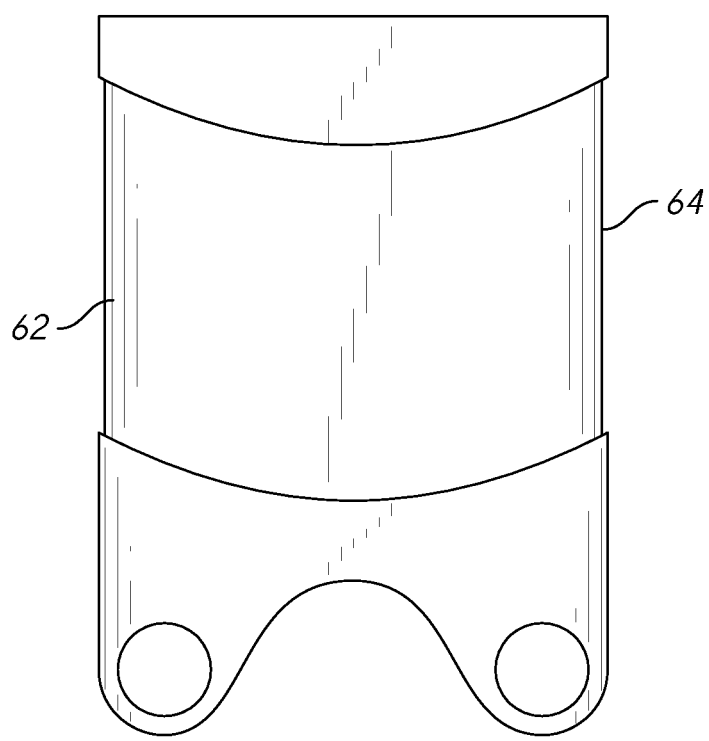
FIG. 9 is a bottom view of a braking surface of a swivel wheel brake assembly.

FIG. 9 illustrates the bottom view of an embodiment of a braking surface 62 configured to frictionally contact a rear swivel wheel 29. The braking surface 62 includes a concave curvature or cut-out 64, as discussed above. As illustrated, the concave curvature or cut-out 64 has a curved or radial path. Preferably, the curved path of the concave cut-out 64 corresponds to the path of the rear wheel 29 as the rear wheel 29 swivels or rotates about its swivel axis. This curved path of the cut-out 64 causes the portion of the wheel 29 in contact with the braking surface 62 to remain within the concave cut out or curvature 64. The curved path also allows for more contact area between the swivel wheel 29 and the braking surface 62, even when the rear wheel 29 is swiveling from side to side. The braking surface 62 can be coupled to the brake body 60 or braking assembly by attachment means such as screws, pins, clips or bolts. Preferably, the braking surface 62 is removable from the brake 60 and can be replaced by a user when worn.

Figure 10:
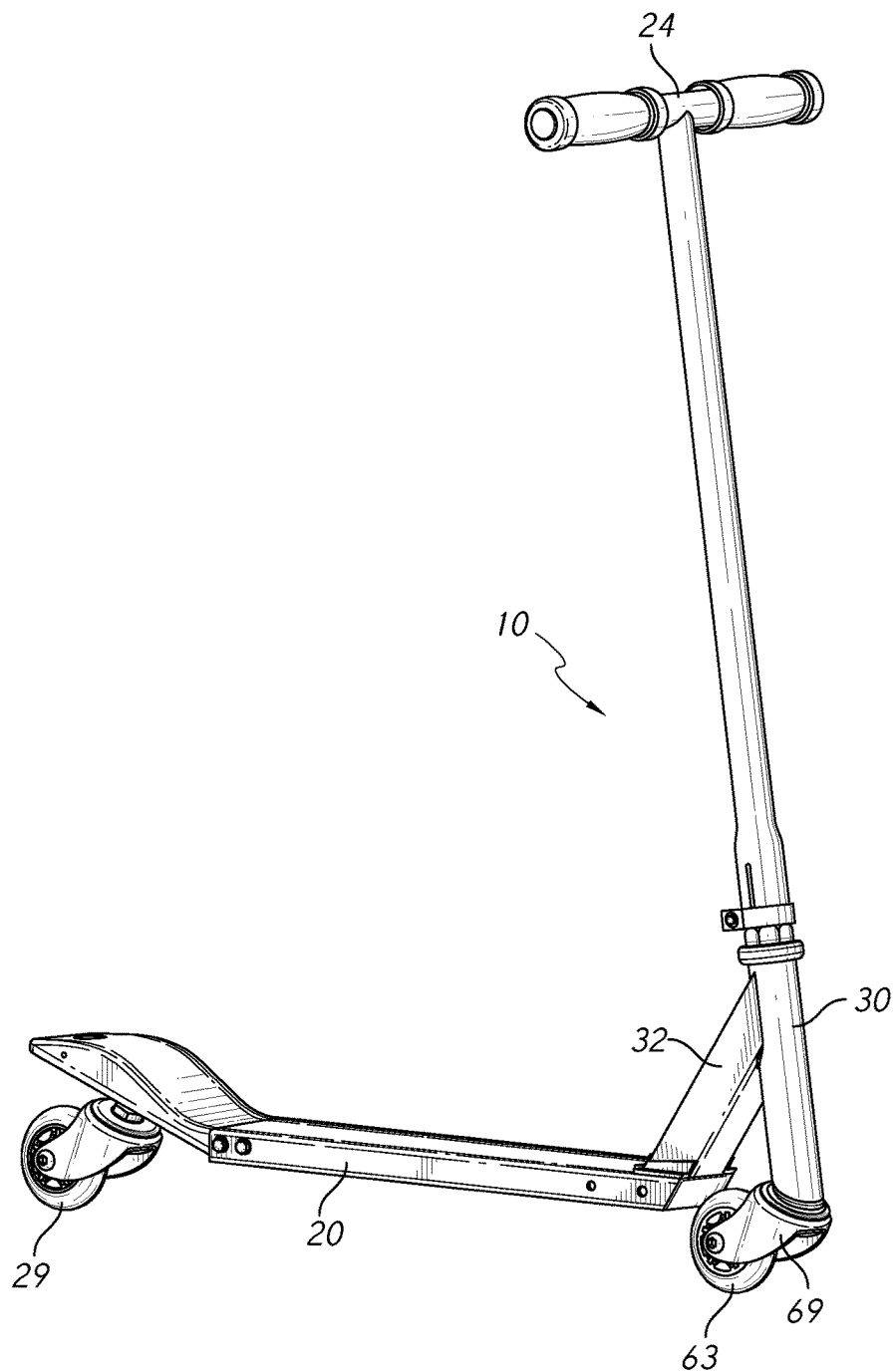
FIG. 10 is a perspective view of an alternate embodiment of a scooter.

FIG. 10 depicts an alternate embodiment of the caster scooter 10. The illustrated embodiment includes a scooter body 20, which includes a deck 22 and a handlebar assembly 24. The scooter 10 includes at least one rear swivel caster wheel 29 supported by the scooter body 20, as described above with respect to any of the previously described embodiments. The scooter 10 also includes at least one front swivel caster wheel assembly 69 including at least one front swivel caster wheel 63 supported by the head tube 30 and operably coupled to the handlebar assembly 24. The front swivel caster wheel 63 rotates about a swivel axis. The illustrated scooter 10 includes a front wheel 63 and a rear wheel 29 spaced apart from one another with the deck 22 extending therebetween. Preferably, the wheels 63, 29 are aligned in the same plane when the wheels 63, 29 are in a neutral steering position, as illustrated, and located at opposite ends of the deck 22. The scooter body 20 includes a support assembly 32 between the head tube 30 and the deck 22. A pivoting mechanism (not shown) may be configured to allow the support assembly 32 and head tube 30 to rotate with respect to the scooter body 20. As illustrated, a preferred embodiment of the scooter 10 also includes a head tube 30 which rotatably supports the handlebar assembly 24 so that the handlebar assembly 24 can rotate or swivel within the head tube 30.

In one preferred embodiment, the front swivel caster wheel assembly 69 and front swivel caster wheel 63 may rotate freely independently of the handlebar assembly 24. In another preferred embodiment, the rotation of the front swivel caster assembly 69 and the front swivel caster wheel 63 may be limited in rotation to a predefined range of motion in relation to the handlebar assembly 24 to allow the user some control as to the general direction of rotation of the front swivel caster wheel 63. In another preferred embodiment, the front swivel caster wheel assembly 69 may comprise a biasing member (such as helical torsion spring 54) to rotationally bias the front swivel caster wheel assembly to its neutral steering position. In another preferred embodiment, the front swivel caster wheel assembly 69 and the front swivel caster wheel 63 may be supported by the scooter body 20 such that the at least one front wheel and at least one rear wheel are spaced apart from one another with the deck 22 extending therebetween. This embodiment may comprise a handlebar assembly 24 supported by the scooter body 20 providing a means for stability and balance to the user while riding the scooter. The handlebar assembly may also be useful to the user to exert eccentric side-to-side forces upon the at least one front swivel caster wheel 63 to cause the front swivel caster wheel to rotate about its pivot axis.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present systems and methods have been described in the context of particularly preferred embodiments, the skilled artisan will appreciate, in view of the present disclosure, that certain advantages, features and aspects of the systems and methods may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the invention herein disclosed should not be limited by the particular embodiments described above, but should be determined only by a fair reading of the claims that follow.

What is claimed is:

1. A personal mobility vehicle comprising:
    a body comprising a deck and a handlebar assembly, the deck having a top surface configured to support a user, the handlebar assembly being rotatable relative to the deck;
    a front wheel supported by the handlebar assembly and pivotable relative to the deck, the front wheel being steerable by the handlebar assembly and the front wheel having a front neutral position in which it points forward and is aligned with a longitudinal axis extending longitudinally through the deck;
    a rear portion supported by the body;
    a rear swivel wheel assembly comprising a rear wheel pivotable about a swivel axis and rotatable about a rear wheel axis, the rear wheel having a neutral position aligned with the longitudinal axis;
    wherein the rear portion has at least an inclined portion that is inclined with respect to the top surface of the deck, wherein the inclined portion comprises a tail that extends upward and rearward at an angle relative to the top surface of the deck, and wherein the swivel axis is inclined with respect to the top surface of the deck,
    wherein the swivel axis and the rear wheel axis are positioned below at least the inclined portion of the rear portion, and
    wherein the rear swivel wheel assembly is mounted on a bottom surface of the tail and positioned entirely below the tail.

2. The personal mobility vehicle of claim 1, wherein the angle between the rear portion and the longitudinal axis corresponding to the top surface is greater than 10 degrees and less than 30 degrees.

3. The personal mobility vehicle of claim 1, wherein the front wheel includes a front biasing member configured to rotationally bias the front wheel toward the front neutral position and the rear swivel wheel assembly includes a rear biasing member configured to bias the rear wheel toward the neutral position of the rear wheel.

4. The personal mobility vehicle of claim 1, further comprising a brake assembly configured to selectively apply a braking force to the rear wheel.

5. The personal mobility vehicle of claim 4, wherein the brake assembly comprises:
    a brake body comprising:
        an attachment portion configured to be supported by the deck or inclined portion;

an actuator portion that is accessible to the foot of a user;

a braking surface configured to apply a braking force when in contact with the rear wheel;

wherein the brake assembly has an engaged position in which the braking surface is in contact with the rear wheel;

wherein the brake assembly is movable to the engaged position in response to the user acting upon the actuator portion.

6. The personal mobility vehicle of claim 5, wherein the brake body is configured to be rotatably supported by the inclined portion.

7. The personal mobility vehicle of claim 5, wherein the brake assembly is biased away from the engaged position.

8. The personal mobility vehicle of claim 5, wherein the actuator portion passes through a void in the deck or inclined rear portion.

9. The personal mobility vehicle of claim 5, wherein the braking surface is replaceable by the user.

10. A personal mobility vehicle comprising:
a deck and a handlebar assembly, the deck having a top surface configured to support a user, the handlebar assembly being rotatable relative to the deck;
a front wheel supported by the handlebar assembly and pivotable relative to the deck, the front wheel being steerable by the handlebar assembly and the front wheel having a front neutral position in which it points forward and is aligned with a longitudinal axis extending longitudinally through the deck;
a rear body supported by the deck, the rear body having a first portion at least partially received within the deck and an angled portion positioned outside of the deck such that than angled portion of the rear body is inclined with respect to a top surface of the deck, wherein the first portion and the angled portion form a unitary body;
a rear swivel wheel assembly comprising a rear wheel rotatable about a swivel axis and rotatable about a rear wheel axis, the rear wheel having a neutral position aligned with the neutral position of the front wheel;
wherein the swivel axis is inclined with respect to the top surface of the deck and wherein the swivel axis is positioned rearward of the first portion of the rear body and forward of the rear wheel axis,
wherein the swivel axis and the rear wheel axis are positioned below at least the angled portion of the rear portion, and
wherein, during riding of the personal mobility vehicle, the rear body is configured to remain substantially stationary relative to the deck.

11. The personal mobility vehicle of claim 10, wherein an angle between the angled portion of the rear body and the longitudinal axis corresponding to the top surface is greater than 10 degrees and less than 30 degrees.

12. The personal mobility vehicle of claim 10, wherein the front wheel includes a front biasing member configured to rotationally bias the front wheel toward the front neutral position and the rear swivel wheel assembly includes a rear biasing member configured to bias the rear wheel toward the neutral position of the rear wheel.

13. The personal mobility vehicle of claim 10, further comprising a brake assembly configured to selectively apply a braking force to the rear wheel.

14. The personal mobility vehicle of claim 13, wherein the brake assembly comprises:
a brake body comprising:
an attachment portion configured to be supported by the deck or angled portion of the rear body;
an actuator portion that is accessible to the foot of a user;
a braking surface configured to apply a braking force when in contact with the rear wheel;
wherein the brake assembly has an engaged position in which the braking surface is in contact with the rear wheel;
wherein the brake assembly is movable to the engaged position in response to the user acting upon the actuator portion.

15. The personal mobility vehicle of claim 14, wherein the brake body is configured to be rotatably supported by the rear body.

16. The personal mobility vehicle of claim 14, wherein the brake assembly is biased away from the engaged position.

17. The personal mobility vehicle of claim 14, wherein the actuator portion passes through a void in the deck or angled rear portion.

18. The personal mobility vehicle of claim 14, wherein the braking surface is replaceable by the user.

19. The personal mobility vehicle of claim 10, wherein the personal mobility vehicle comprises a kick scooter.

20. The personal mobility vehicle of claim 1, wherein the personal mobility vehicle comprises a kick scooter.

21. A kick scooter comprising:
a body comprising a deck and a handlebar assembly, wherein the deck comprises a front portion, a rear portion, and a top surface configured to support a user, and wherein the handlebar assembly is rotatable relative to the deck;
a front swivel wheel assembly supported by the handlebar assembly, the front swivel wheel assembly comprising a front wheel pivotable about a front swivel axis and rotatable about a front wheel axis, the front wheel having a front neutral position in which the front wheel points forward and is aligned with a longitudinal axis extending longitudinally through the deck;
a rear swivel wheel assembly comprising a rear wheel pivotable about a rear swivel axis and rotatable about a rear wheel axis, the rear wheel having a neutral position aligned with the longitudinal axis;
wherein the rear portion has at least an inclined portion that is inclined with respect to the top surface of the deck and extends upward and rearward at an angle relative to the top surface of the deck, and the rear swivel axis is inclined with respect to the top surface of the deck, and
wherein the rear swivel axis and the rear wheel axis are positioned below at least the inclined portion of the rear portion.

22. The kick scooter of claim 21, wherein the front wheel is freely pivotable independently of the handlebar assembly.

23. The kick scooter of claim 21, wherein the front swivel wheel assembly includes a front biasing member configured to rotationally bias the front wheel toward the front neutral position.

* * * * *